Oct. 24, 1967  P. G. GRIMES  3,348,829
AERATOR
Filed Dec. 18, 1963

Inventor
Patrick G. Grimes
By Robert B. Benson
Attorney 3,348,829
AERATOR
Patrick G. Grimes, Milwaukee, Wis., assignor to Allis-Chalmers Manufacturing Company, Milwaukee, Wis.
Filed Dec. 18, 1963, Ser. No. 331,520
7 Claims. (Cl. 261—152)

This invention relates generally to liquid aeration devices and more particularly to an improvement in mechanical type aerators.

Gases such as air or oxygen have been added to liquid in the past by a variety of mechanical devices. Some devices utilized paddlelike members which were dipped into the liquid contained in an open topped tank. The members then presented their resulting film covered surfaces for contact by the air above the liquid. Air was absorbed in the films which in turn were washed off into the liquid as the members returned thereto. Thus, the liquid was enriched with the oxygen contained in the air. Other devices used a pluraltiy of rotating disks in lieu of the paddle-like members previously mentioned. The operation of both devices is similar.

Applicant has improved on the devices described above by supplying gas at high pressures such as 8 to 10 atmospheres to a rotating disk device which is totally enclosed in a container. An increase of close to 80 parts per mililon (p.p.m.) of oxygen in the liquid was noted when the device was operated with air at 150 p.s.i. This is ten times as much dissolved oxygen in the liquid as was obtained from the same device when operated with air at one atmosphere of pressure. Of course, using pure oxygen rather than air would provide a substantial increase over this figure. Further, it has been found that cooling the liquid before and during treatments greatly increased the solubility of oxygen therein. In the case of water, the solubility of oxygen was virtually doubled when the water was cooled from 30° C. to 10° C. before treatment. Utilizing the high pressure of the gas alone or in combination with the liquid cooling feature produces a highly efficient device for dissolving gas into a liquid. Because the liquid treated with this device has such a large amount of gas dissolved therein, it can be blended with larger masses of untreated liquid to produce a mixture having an acceptable level of dissolved gas. The pressurized aeration device of this invention is of special value in treating large volumes of liquid such as dissolving oxygen in streams or lakes or in treating sewage.

It is, therefore, a primary object of this invention to provide a new and improved liquid aeration device.

Another object of this invention is to provide a liquid aeration device that is more efficient than those now in use.

Another object of this invention is to provide a liquid aeration device that is more compact than those now in use.

Other objects and advantages will be apparent from the following description when read in connection with the accompanying drawings, in which.

Figure 2:
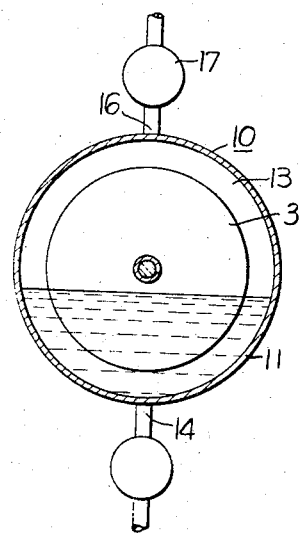
FIG. 2 is a section along line II—II of FIG. 1.
Figure 1:
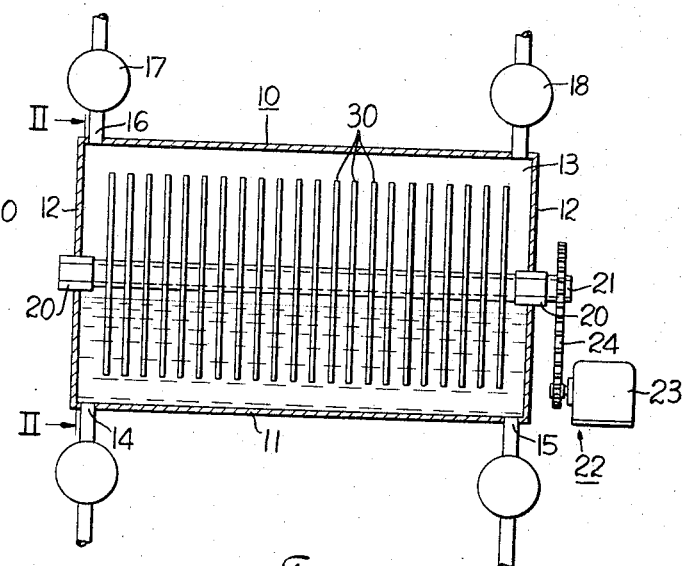
FIG. 1 is a vertical section of an aeration device embodying this invention.

Referring to FIGS. 1 and 2, the aerator 10 has a shell or container 11 for supporting various elements of the device. The shell 11 has a pair of end plates 12 that cooperate with the shell to form an enclosure 13. The shell 11 has a pair of port means 14, 15 for admitting and discharging the liquid to be treated. The shell also has a port means 16 for admitting a gas into the enclosure 13. A valve 17 is associated with the port means 16 to keep the gas pressure inside the shell at a predetermined level. A relief valve 18 is provided to allow purging of the gas within the shell when desired such as at the close of the aeration process.

Each end plate 12 supports a bearing 20. Shaft 21 is rotatably mounted in the bearings 20. The shaft 21 also connects with and is rotated by a suitable drive unit 22 such as the illustrated motor 23 and belt drive 24. Wettable disks 30 are located inside shell 11 and are mounted at spaced intervals on shaft 21 for rotation therewith.

The exact shape of the disks is not critical to this invention. For example, the disks could be annular as shown or could be formed by a sheet of material mounted along the shaft in the form of a helix. The sheet projecting radially from the shaft along its entire circumference would also provide a large surface area and could be partially immersed in the liquid and partially exposed to a gas much like the illustrated disks 30.

Figure 4:
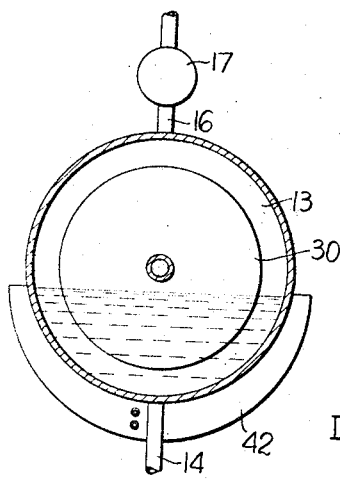
FIG. 4 is a section along line IV—IV of FIG. 3.
Figure 3:
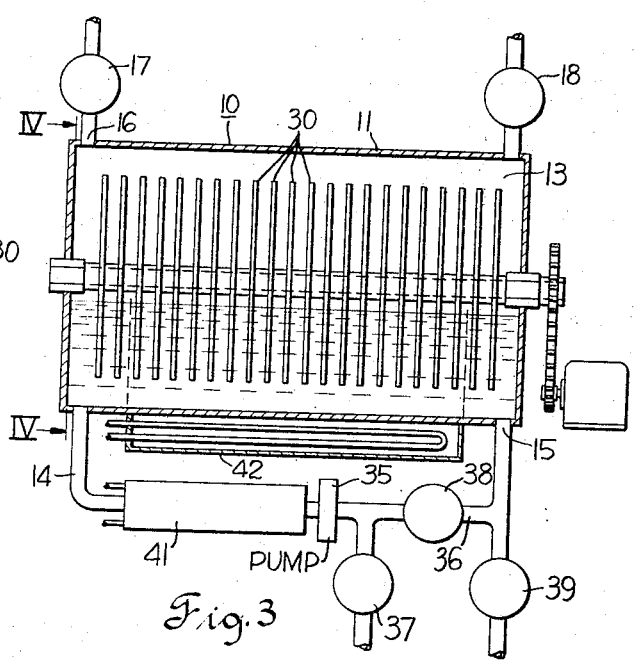
FIG. 3 is a vertical section of a modification of the aerator of this invention for use with recirculation of the liquid.

FIGS. 3 and 4 disclose a modification of the device of this invention wherein provisions are made for the conduction and recirculation of the liquid through the enclosure 13. A pump 35 is provided for moving the liquid through the inlet pipe 14 into the enclosure 13 and out through the outlet. A return conduit 36 connects the outlet 15 to the inlet 14 for recirculation of liquid through enclosure 13. Suitable valves are provided to control the flow of liquid through the container 11. For example, valve 37 is used to control the amount of untreated liquid supplied to the enclosure. Valve 38 is used to control the amount of treated liquid from the enclosure that can be recirculated. Valve 39 controls the exit of the treated liquid from the device and cooperates with valve 38 to control the amount of liquid being recirculated.

As mentioned above, reducing the temperature of the liquid being treated increases the solubility of gas in the liquid. Hence, suitable cooling means 41 are provided around the inlet pipe 14 to cool the liquid entering the enclosure 13. Cooling means such as illustrated at 42 can also be provided for the shell 11 if desired.

In operation, the liquid to be treated is caused to move through the bottom of the shell 11 of the device. Air or other suitable gas is introduced into the shell 11 at a pressure of more than one atmosphere. For greater efficiency, the gas can be supplied and maintained at pressures which range up to 150 p.s.i. by controlling the valve 17. The disks 30 are mounted so that their lower portions are immersed in the bulk liquid being treated and their upper portions are in contact with the air. Although the liquid in FIGS. 1-4 is shown at a level below the midpoint of the disk, it is to be understood that this is merely illustrative and the depth to which the disks are submerged in the liquid is set to obtain maximum efficiency. Some of the factors that can effect the depth to which the disks should be immersed in the liquid are: the gas pressure, type of gas being used, the liquid being treated, and the temperature of the liquid.

Upon rotation, the disks pick up a film or coating of liquid as they rotate through the liquid in the lower part of shell 11. This coating on each disk is exposed to the gas in the shell above the liquid. Some of the gas is absorbed in the coating. As the disks continue to rotate, they pass again through the liquid where the coating is washed off the disks. The liquid in the shell is thus enriched with the gas. If the liquid is not saturated with gas after one passage through the device as disclosed in FIGS. 1 and 2, it can be recirculated by use of the modification illustrated in FIGS. 3 and 4. In such a case valve 38 is opened and valves 37 and 39 partially closed until the desired amount of treated liquid from the enclosure is flowing through the return conduit 36 back into the enclosure.

The most common use for this device is in aeration processes in which the gas is air or pure oxygen and the liquid is water or sewage.

It can be seen that by the utilization of this invention, a liquid can be obtained that has a much higher concentration of gas than can be provided by aeration devices now in use. Consequently, the device of this invention can be substituted for much larger units where the amount of liquid to be treated is fixed. Another application for this aeration device is to treat smaller volumes of liquid and mix the treated liquid with untreated liquid to produce a liquid with a desired gas content. An example of such an application is treating a portion of a polluted stream and pumping the treated liquid back into the stream. If a gas other than air is used in treating the liquid, it may be desirable periodically to purge the enclosure 13. This is accomplished by closing valve 17 and opening valve 18. The enclosure is then evacuated through valve 18.

Although but two embodiments of this invention have been illustrated and described, it will be apparent to those skilled in the art that various changes and modifications can be made therein without departing from the spirit of the invention or scope of the appended claims.

Having now particularly described and ascertained the nature of my said invention and the manner in which it is to be performed, I declare that what I claim is:

1. A pressurized device for dissolving an oxygen containing gas in a liquid comprising, in combination, a pressure resistant shell having a gas inlet port for admitting said oxygen containing gas into the upper portion of said shell, means for conducting said liquid through the lower portion of said shell, a shaft mounted in said shell for rotation about a horizontal axis, a plurality of axially spaced disks supported on said shaft for rotation therewith and being partially immersed in said liquid and partially exposed to said gas in said upper portion of said shell above said liquid, means for increasing the solubility of said oxygen containing gas in said liquid including means for supplying said gas through said inlet port at a pressure greater than several atmospheres and valve means associated with said inlet port for maintaining said gas at said pressure within said upper portion of said shell, and means for rotating said shaft so that said disks pick up a coating of said liquid and expose it to said oxygen containing gas and return said exposed coating to said liquid.

2. A device in accordance with claim 1 wherein said means for increasing the solubility of said gas also includes means for cooling said liquid.

3. A device in accordance with claim 1 wherein said gas supplying means constitutes means for supplying substantially pure oxygen to said upper portion of said shell.

4. A device in accordance with claim 2 and including means for recirculating a portion of said liquid through said lower portion of said shell.

5. A device in accordance with claim 4 wherein said lower portion of said shell has liquid inlet and discharge openings and said recirculating means includes said openings, conduit means connecting said openings, and a pump in said conduit means between said openings and wherein said liquid cooling means is connected to said conduit means.

6. A device in accordance with claim 5 wherein said gas supplying means constitutes means for supplying substantially pure oxygen to said upper portion of said shell.

7. A pressurized device for oxygenating a liquid comprising, in combination, a closed pressure resistant shell having liquid inlet and discharge ports communicating with the lower portion of said shell, means including said inlet and discharge ports for conducting said liquid through said lower portion of said shell, a shaft mounted in said shell for rotation about a horizontal axis, a plurality of axially spaced apart disks supported on said shaft for rotation therewith and being partially immersed in said liquid and partially exposed in the upper portion of said shell, means for supplying an oxygen containing gas to said upper portion of said shell above said liquid at a pressure greater than several atmospheres and for maintaining said gas at said pressure within said upper portion of said shell, means for rotating said shaft so that said disks pick up a coating of said liquid and expose it to said gas and return said exposed coating to said liquid, means including conduit means connecting said liquid discharge and inlet ports and a pump in said conduit means for recirculating said liquid through said lower portion of said shell, means for increasing the solubility of said oxygen containing gas in said liquid and including said means for supplying and maintaining said gas at a pressure greater than several atmospheres, and also including first cooler means disposed adjacent said shell for cooling said liquid in said lower portion of said shell and second cooler means disposed in said conduit between said pump and said liquid inlet port for cooling the liquid entering said shell.

References Cited

UNITED STATES PATENTS

| | | | |
|---|---|---|---|
| 1,253,401 | 1/1918 | Lorimer | 55—232 |
| 1,296,315 | 3/1919 | Phillips | 261—92 |
| 1,767,089 | 6/1930 | Miller et al. | 55—231 |
| 2,060,732 | 11/1936 | Hopkins et al. | 261—92 |
| 2,090,287 | 8/1937 | Cornelius | 261—151 |
| 2,559,129 | 7/1951 | Miller | 55—195 |
| 2,698,287 | 12/1954 | Bowden et al. | 202—175 |
| 2,998,095 | 8/1961 | Mitchell | 55—189 |
| 3,053,254 | 9/1962 | Galajda | 261—92 |
| 3,210,912 | 10/1965 | Peake et al. | 55—195 |
| 3,256,802 | 6/1966 | Karr. | |

OTHER REFERENCES

Foust, A. S., et al., Principles of Unit Operations, John Wiley and Sons, Inc., 1960, pp. 21 and 552.

HARRY B. THORNTON, *Primary Examiner.*

E. H. RENNER, *Assistant Examiner.*